United States Patent [19]

Miller

[11] Patent Number: 5,353,155
[45] Date of Patent: Oct. 4, 1994

[54] METHODS AND APPARATUS FOR COMBINING ARRAYS OF LIGHT BEAMS

[75] Inventor: David A. B. Miller, Fair Haven, N.J.

[73] Assignee: AT&T Bell Laboratories, Murray Hill, N.J.

[21] Appl. No.: 991,635

[22] Filed: Dec. 16, 1992

[51] Int. Cl.$^5$ .................. G02B 27/10; G02B 27/42
[52] U.S. Cl. .................. 359/618; 359/572; 359/15; 359/583
[58] Field of Search ............ 359/618, 629, 639, 640, 359/572, 15, 583

[56] References Cited

U.S. PATENT DOCUMENTS

| | | | |
|---|---|---|---|
| 3,970,963 | 7/1976 | Chester | 359/634 |
| 4,701,005 | 10/1987 | Noguchi | 359/17 |
| 4,813,762 | 3/1989 | Leger et al. | 359/629 |
| 4,940,309 | 7/1990 | Baum | 359/618 |

FOREIGN PATENT DOCUMENTS 316020 12/1988 Japan .................. 359/572

*Primary Examiner*—Jon W. Henry
*Attorney, Agent, or Firm*—Gerard A. deBlasi

[57] ABSTRACT

Arrays of light beams are combined in a manner that minimizes optical power loss by passing a first array of light beams through an angle-variant device onto a target surface while reflecting a second array of light beams off the angle-variant device onto the target surface. The light beams of the first array are arranged to strike the angle-variant device at a first family of angles at which the angle-variant device is substantially transmissive. The light beams of the second array are arranged to strike the angle-variant device at a second family of angles at which the angle-variant device is substantially reflective.

15 Claims, 4 Drawing Sheets

| BEAM | ANGLE (DEGREES) | T | S |
|---|---|---|---|
| $\alpha_3$ | 43.67 | 0.111 | 0.889 |
| $\alpha_2$ | 46.53 | 0.111 | 0.889 |
| $\alpha_1$ | 49.39 | 0.111 | 0.889 |
| $\beta_3$ | 42.24 | 0.993 | 0.007 |
| $\beta_2$ | 45.1 | 1.000 | 0.000 |
| $\beta_1$ | 47.96 | 0.998 | 0.002 |

METHODS AND APPARATUS FOR COMBINING ARRAYS OF LIGHT BEAMS

TECHNICAL FIELD

This invention relates to methods and apparatus for combining multiple arrays of light beams and, more particularly, to methods and apparatus for directing multiple arrays of light beams onto a single surface.

BACKGROUND OF THE INVENTION

In optical switching and processing systems using arrays of light beams and arrays of devices with optical inputs or outputs, it is often necessary to direct several arrays of light beams onto the same surface of a device. A key problem that arises is to achieve this result without substantial loss of optical power and without introducing optical aberrations.

One technique that has been used to direct multiple arrays of light beams onto a target surface is to use a patterned, or so-called "space-variant," mirror, in which the reflectivity of the mirror varies in space. One array of light beams is arranged so that the light beams strike portions of the mirror that are highly transmissive. This first array of light beams passes through the mirror to strike the target surface. The other array of light beams is arranged to reflect from the mirror and onto the target surface. An imaging lens often is required to image the mirror plane onto the surface. Passing the beams through an image plane, however, introduces undesirable optical aberrations which limit the size of the array. Moreover, use of an imaging lens increases the distance required between the space-variant mirror and the target surface, and thus increases the overall system size.

Another technique for combining arrays of light beams is referred to as "pupil plane combination." In this technique, a first array of light beams is transmitted through one half of the pupil plane of a lens and a second array of light beams is transmitted through the other half of the lens pupil plane. This technique, however, is susceptible to large optical aberrations due to lens imperfections.

Thus, it would be desirable to provide a method for combining arrays of light beams which minimizes susceptibility to optical aberrations, which results in a compact system, and which minimizes optical power loss.

SUMMARY OF THE INVENTION

Arrays of light beams are combined in a manner that minimizes optical power loss by passing a first array of light beams through an angle-variant device onto a target surface while reflecting a second array of light beams off the angle-variant device onto the target surface. The light beams of the first array are arranged to strike the angle-variant device at a first family of angles at which the angle-variant device is substantially transmissive. The light beams of the second array are arranged to strike the angle-variant device at a second family of angles at which the angle-variant device is substantially reflective.

In an exemplary embodiment of the invention, the angle-variant device is a Fabry-Perot resonator that is arranged at an angle of approximately 45 degrees with respect to a target surface. Two arrays of light sources, one normal to the target surface and one substantially parallel to the target surface, direct arrays of light beams at the Fabry-Perot resonator. A collimating lens causes the light beams normal to the target surface to strike the Fabry-Perot resonator at a set of angles which allow the beams to pass through the resonator without reflection. A second collimating lens causes the light beams traveling parallel to the target surface to strike the Fabry-Perot resonator at a set of angles which causes the beams to reflect from the resonator and onto the target surface. A focusing lens focuses the light beams from the arrays to specific points on the target surface.

DETAILED DESCRIPTION

The angle of incidence $\theta$ at which a light beam strikes an angle-variant device determines whether the light beam is reflected from or transmitted through the device. As described below, an angle-variant device transmits light beams incident on the device at one set of angles and reflects light beams incident on the device at a second set of angles.

I have realized that arrays of light beams can be combined by causing a first array of light beams to strike an angle-variant device at a first set of angles, such that the first array of beams is transmitted through the angle-variant device, while causing a second array of light beams to strike the angle-variant device at a second set of angles such that the second array of beams is reflected from the angle-variant device. The combined arrays of beams travel in substantially the same direction, and may be interleaved with one another.

Figure 1:
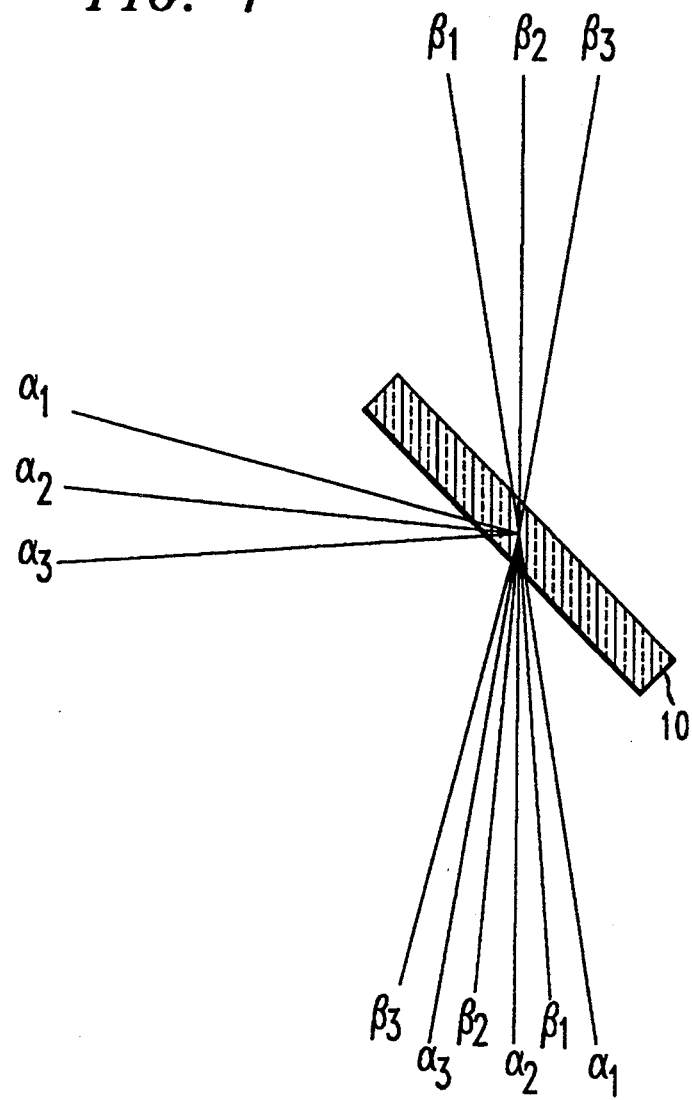
FIG. 1 is a simplified schematic diagram showing an angle-variant device combining two arrays of collimated light beams in accordance with the principles of the present invention.

FIG. 1 illustrates the principles of the invention. In particular, FIG. 1 shows two collimated arrays of light beams, designated generally as $\alpha$ and $\beta$, respectively, which are incident on opposite sides of an angle-variant device 10. In this exemplary embodiment, angle-variant device 10 is a Fabry-Perot resonator (hereafter referred to as Fabry-Perot resonator 10). Array $\alpha$, which includes light beams $\alpha_1$, $\alpha_2$, and $\alpha_3$, is substantially reflected from Fabry-Perot resonator 10 onto a target surface 12, which may be, for example, the surface of a device comprising an array of photodetectors. Array $\beta$, which includes light beams $\beta_1$, $\beta_2$, and $\beta_3$, passes substantially without reflection through Fabry-Perot resonator 10 and onto target surface 12. The beams of array $\alpha$ strike Fabry-Perot resonator 10 at angles at which the resonator is highly reflective, while the beams of array β strike the resonator at angles at which the resonator is highly transmissive.

Arrays α and β are oriented relative to one another and relative to Fabry-Perot resonator 10 such that transmission of one array of beams and reflectance of the other array of beams causes both arrays to be incident on target surface 12. The angle of incidence, which is measured with respect to the normal to the surface of Fabry-Perot resonator 10, preferably is selected in the vicinity of 45 degrees so that Fabry-Perot resonator 10 reflects through a right angle. Of course, one skilled in the art will appreciate that various alternative combinations of angles of incidence and resonator orientation could be used to combine the arrays of light beams.

Figure 2:
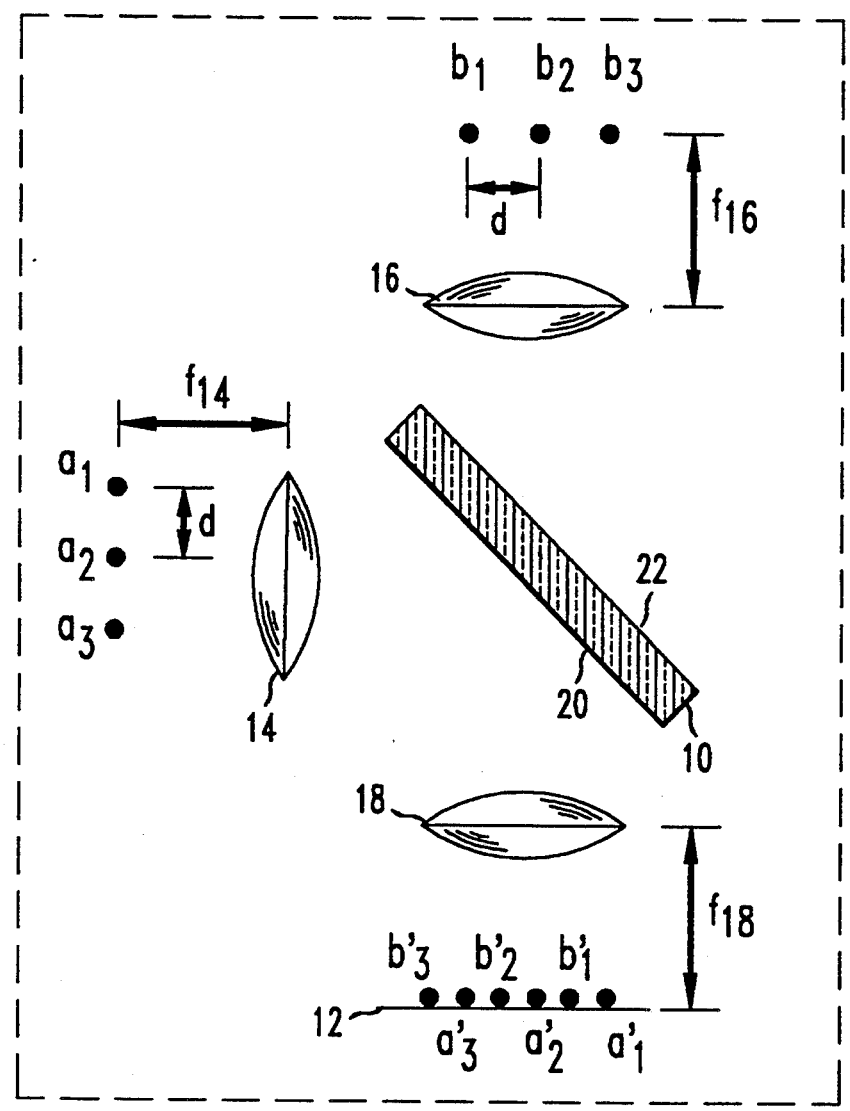
FIG. 2 is a schematic diagram of an exemplary embodiment of apparatus for combining the arrays of light beams of FIG. 1.
Figures 5, 6:
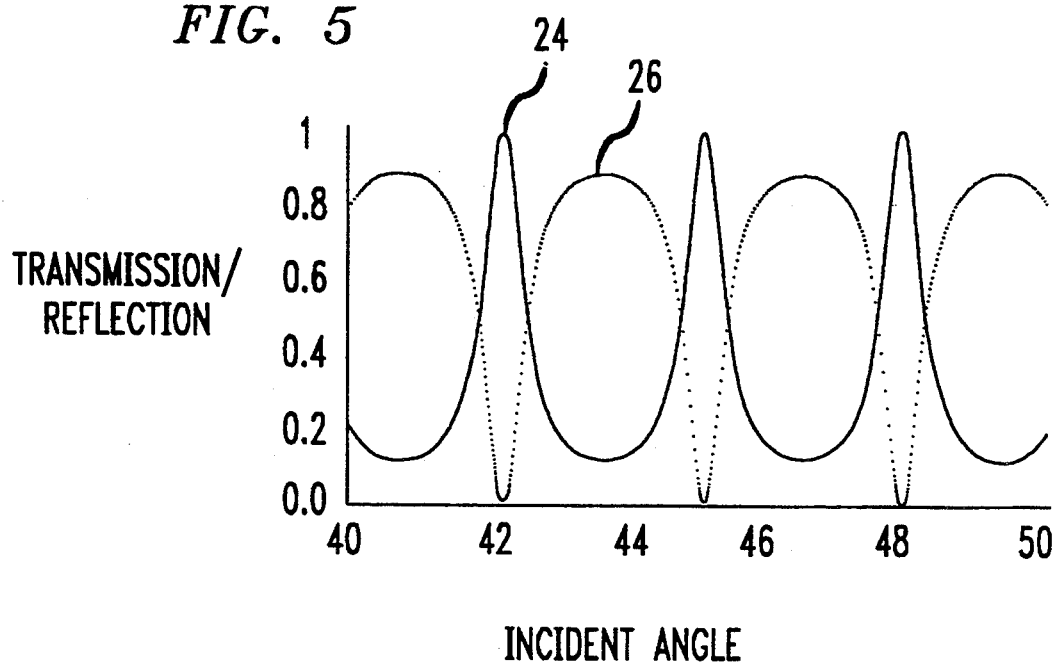
FIG. 5 is an illustrative graph of transmission and reflection data for light incident on the Fabry-Perot resonator of FIGS. 3 and 4 over a selected range of incident angles.
FIG. 6 is a table showing illustrative transmission and reflection values for the light beams of FIG. 1 for selected angles of incidence.

FIG. 2 shows an exemplary embodiment of apparatus for combining two arrays of substantially parallel light beams in accordance with the principles of the invention. The apparatus includes Fabry-Perot resonator 10, collimating lenses 14 and 16, and a focusing lens 18. Light beams emitted from sources $a_1$, $a_2$, and $a_3$ are collimated by collimating lens 14. The collimated beams are directed to a first mirror surface 20 of Fabry-Perot resonator 10 and strike surface 20 at a family of angles corresponding to high reflectance. Similarly, light beams from sources $b_1$, $b_2$, and $b_3$ are collimated by collimating lens 16 and are directed to a second mirror surface 22 of Fabry-Perot resonator 10. The beams from sources $b_1$, $b_2$, and $b_3$ strike surface 22 at a family of angles corresponding to high transmission. (Exemplary angles of incidence for light beam arrays α and β are described below and are shown in FIG. 6.) The positions of lenses 14 and 16 are selected to achieve the desired angles of incidence for the respective arrays of light beams.

Lens 18 receives the reflected light beams of array α and the transmitted light beams of array β at different angles. Lens 18 focuses the beams to form the interleaved array of spots $a_1'$, $b_1'$, $a_2'$, $b_2'$, $a_3'$, and $b_3'$ on target surface 12. The positions of lenses 14 and 16 can be adjusted so that the spots are interleaved as shown in FIG. 2.

Figure 3:
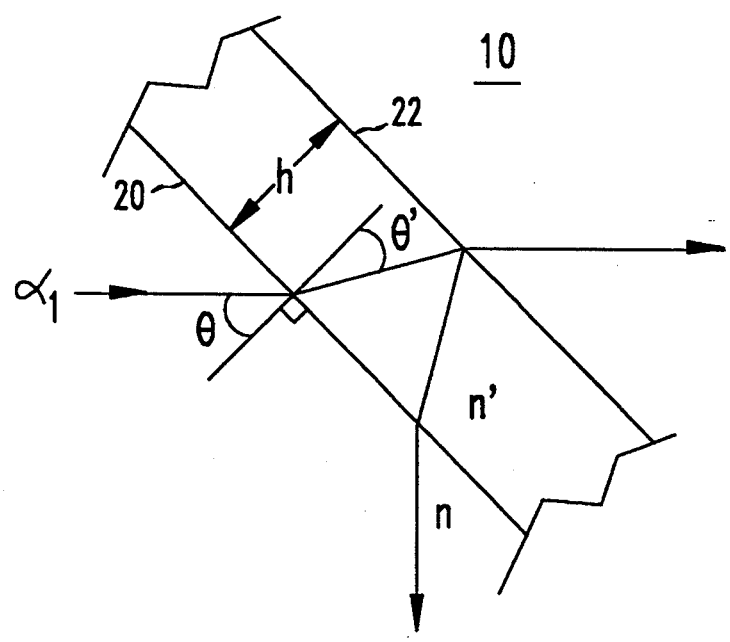
FIGS. 3 and 4 are schematic diagrams of a Fabry-Perot resonator showing reflection and transmission, respectively, of selected light beams of FIG. 1.
Figure 4:
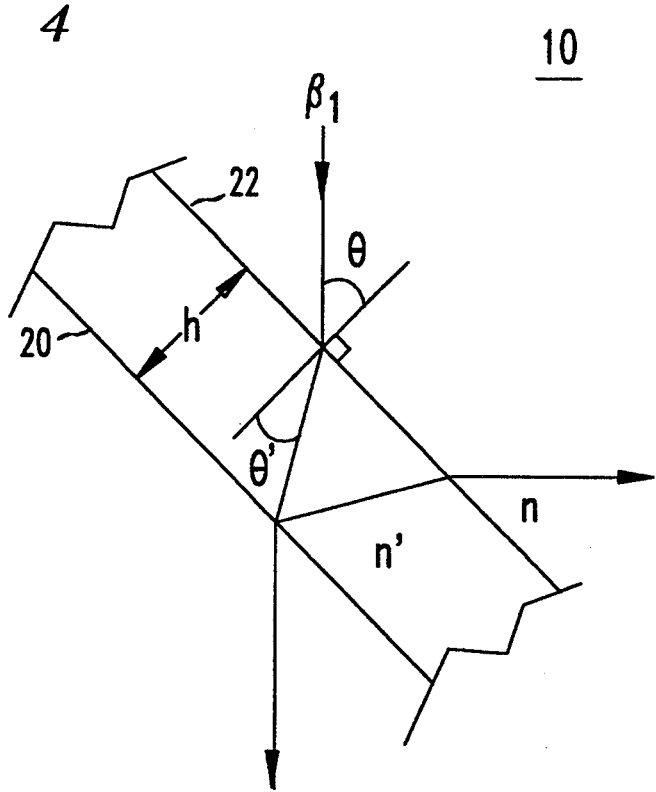

FIGS. 3 and 4 show Fabry-Perot resonator 10 in greater detail and illustrate the angles of illustrative light beams in the resonator. In each figure, a beam is incident at an angle θ, relative to the normal, on a surface of Fabry-Perot resonator 10. More particularly, FIG. 3 shows light beam $a_1$ incident on surface 20 and FIG. 4 shows light beam $\beta_1$ incident on surface 22. The pan of beam $\alpha_1$ that is transmitted by surface 20 will propagate at an angle θ' relative to the normal to surface 20. Similarly, the part of beam $\beta_1$ that is transmitted by surface 22 will propagate at an angle θ' relative to the normal to surface 22.

Scientific principles describing the angle-variant properties of Fabry-Perot resonator 10 will now be described, followed by a description of an exemplary system and Fabry-Perot resonator design. The characteristics of a Fabry-Perot resonator are described in *Principles of Optics*, by M. Born and E. Wolf, Sixth Ed., Pergamon Press, New York, 1980, pp. 323–41, which is hereby incorporated by reference.

In a preferred embodiment of the invention, the reflectivities of the front and back mirror surfaces 20 and 22 of Fabry-Perot resonator 10 are equal. In this case, the transmission T of the Fabry-Perot resonator is given by $$T = \frac{1}{1 + F\sin^2\delta/2} \quad (1)$$

and the reflection S of the resonator is given by $$S = \frac{F\sin^2\delta/2}{1 + F\sin^2\delta/2}, \quad (2)$$

where $$F = \frac{4R}{(1-R)^2} \quad (3)$$

and $$\delta = \frac{4\pi}{\lambda_0} n'h\cos\theta'. \quad (4)$$

In the equations above, R is the reflectivity of Fabry-Perot mirror surfaces 20 and 22, $\lambda_0$ is the free space wavelength of the lightwave, n' is the refractive index of the medium separating mirror surfaces 20 and 22, h is the distance between the mirror surfaces, and θ' is the angle between the light beam ($\alpha_1$ or $\beta_1$) and the normal to the mirror surfaces, as measured inside the medium. Phase changes of the lightwave on reflection off mirror surfaces 20 and 22 have been ignored, as they do not affect the principles of operation of the device.

Fabry-Perot resonator 10 becomes completely transparent when $\delta = 2\pi m$, where m is an integer, provided that the reflectivities of mirror surfaces 20 and 22 are equal. Hence, Fabry-Perot resonator 10 is highly transmitting for angles θ' such that $$\cos\theta' = \frac{m\lambda_0}{2n'h}, \quad (5)$$

where m is a resonance of the Fabry-Perot resonator. Using Snell's law, one can deduce the external angle of incidence associated with the mth Fabry-Perot transmission resonance, $$\theta_m = \sin^{-1}\left\{\frac{n'}{n}\sin\left(\cos^{-1}\left[\frac{m\lambda_0}{2hn'}\right]\right)\right\}. \quad (6)$$

The family of angles at which the light beams of array β are incident on Fabry-Perot resonator 10 (see FIG. 1) are selected from among this set of highly transmitting angles.

The angular separation δθ (in radians) between adjacent high transmission angles is given approximately by the expression $$\delta\theta = -\frac{\lambda_0 \cot\theta'}{2nh \cos\theta}, \quad (7)$$

provided that m for one of these resonance is much greater than 1. The minus sign in this equation can be ignored, as we are only interested in the magnitude of δθ.

Fabry-Perot resonator 10 is highly reflecting for angles in between the angles of high transmission. It is from this set of highly reflecting angles that the family of incident angles of the light beams of array α (see FIG. 1) are selected. For example, when $\delta = (2m+1)\pi$, which will occur for angles approximately halfway between the angles of high transmission, the reflectivity, $R_{max}$, of Fabry-Perot resonator 10 is given by $$R_{max} = \frac{F}{1 + F}. \qquad (8)$$

The reflectivity can be quite large. For example, for a mirror reflectivity R of 50 percent, $R_{max}$ is approximately 89 percent.

An exemplary system and Fabry-Perot resonator design will now be described with reference to FIG. 2. The light sources of linear arrays a and b are spaced apart a distance of d=500 $\mu$m. The focal lengths $f_{14}$, $f_{16}$, and $f_{18}$, respectively, of lenses 14, 16, and 18 are 1 cm. Once the light beams from a given array are collimated by the associated lens, the angular separation between beams from adjacent sources in a given array will be, approximately, $\delta\theta = \tan^{-1}$ (500 $\mu$m/1 cm)=2.86 degrees. For this illustrative resonator design, we choose a wavelength $\lambda_0$=0.85 $\mu$m, and refractive indices of n=1 and n'=1.5. This wavelength is commonly used in optical systems using laser diodes to provide the optical power. These refractive indices correspond to a glass Fabry-Perot resonator 10 surrounded by air or vacuum. We choose to operate in the vicinity of $\theta$=45 degrees, so that Fabry-Perot resonator 10 reflects through a right angle. According to Snell's law, the angle inside the resonator will be in the vicinity of $\theta'$=28.13 degrees. By rearrangement of equation (7), it can be deduced that the thickness, h, of Fabry-Perot resonator 10 should be approximately 22.5 $\mu$m. Methods for fabricating a Fabry-Perot resonator with the desired thickness and surface reflectivity are well known to those skilled in the art.

Equation (4) can be written explicitly in terms of the external incident angle $\theta$ to obtain the expression $$\delta = \frac{4\pi}{\lambda_0} n' h \cos\left[\sin^{-1}\left(\frac{n}{n'}\sin\theta\right)\right]. \qquad (9)$$

Using this expression and equations (1) and (2), the transmission T and the reflection S of Fabry-Perot resonator 10 can be calculated as a function of the incident angle $\theta$.

FIG. 5 is a graph of the transmission and reflection values of Fabry-Perot resonator 10 using the design criteria described above. Lines 24 and 26 represent transmission and reflection, respectively, over a range of incident angles in the vicinity of $\theta$=45 degrees. The graph clearly illustrates the angle-variant properties of Fabry-Perot resonator 10, showing high transmission peaks at one family of incident angles and high reflection peaks (interspersed between the high transmission peaks) at a second family of incident angles.

The table of FIG. 6 shows the angles of incidence for beams $\alpha_1$, $\alpha_2$, $\alpha_3$, $\beta_1$, $\beta_2$, and $\beta_3$ of FIG. 1, and the resulting transmission and reflection values, for the illustrative system and Fabry-Perot resonator design criteria described above. From FIG. 6 it can be shown that two equally-spaced sets of light sources can produce interleaved images, with the light beams from one set of sources (i.e., sources $a_1$, $a_2$, and $a_3$ of FIG. 2) being reflected from the Fabry-Perot resonator 10 with greater than 88 percent reflectivity, while the light beams from the other set of sources (i.e., sources $b_1$, $b_2$, and $b_3$ of FIG. 2) are transmitted with greater than 98 percent transmission. Thus, the angle-variant device can be designed so as to combine multiple arrays of light beams with little optical power loss.

Although the invention has been described with reference to a Fabry-Perot resonator as the angle-variant device, one skilled in the an will appreciate that the principles of the invention are equally applicable to any device which transmits light substantially without reflection at a first family of angles relative to a reference plane of the device and reflects light at a second family of angles relative to that reference plane. The angle-variant device could be, for example, a diffractive optical device, such as a volume diffraction grating. In view of the teachings of this disclosure, one skilled in the an could design and construct such alternative angle-variant devices using techniques well-known in the art.

It will also be apparent to one skilled in the art that other modifications can be made to the described embodiment without departing from the scope of the invention. For example, although the invention has been described in the context of combining linear arrays of light beams, the invention is equally applicable to combining multi-dimensional arrays of light beams. Also, the principles of the invention could be utilized to combine simultaneously three or more different arrays of light beams using a single angle-variant device.

I claim:

1. Apparatus for directing a plurality of arrays of light beams onto a target surface, each array including at least two light beams, the apparatus comprising:
   an angle-variant device having first and second surfaces, said angle-variant device transmitting light incident thereon at a first set of incident angles and reflecting light incident thereon at a second set of incident angles;
   means for directing a first array of light beams onto the first surface of the angle-variant device at the first set of incident angles, such that the first array of light beams is transmitted through the angle-variant device and onto the target surface; and
   means for directing a second array of light beams onto the second surface of the angle-variant device at the second set of incident angles, such that the second array of light beams is reflected from the angle-variant device and onto the target surface.

2. The invention of claim 1 further comprising means for directing a third array of light beams onto the first surface of the angle-variant device at predetermined angles selected from among the first set of incident angles, such that the third array of light beams is transmitted through the angle-variant device and onto the target surface.

3. The invention of claim 1 further comprising means for directing a third array of light beams onto the second surface of the angle-variant device at predetermined angles selected from among the second set of incident angles, such that the third array of light beams is reflected from the angle-variant device and onto the target surface.

4. The invention of claim 1 wherein the angle-variant device is a Fabry-Perot resonator.

5. The invention of claim 1 wherein the angle-variant device is a diffractive optical device.

6. The invention of claim 1 wherein at least one of the first and second arrays of light beams is a multi-dimensional array.

7. The invention of claim 1 further comprising means for focusing beams of light, the focusing means being disposed between the angle-variant device and the target surface to focus light beams from the angle-variant device onto the target surface.

8. A method for directing a plurality of arrays of light beams onto a target surface, each array comprising at least two light beams, the method comprising the steps of:

transmitting a first array of light beams through an angle-variant device and onto the target surface, each light beam of the first array striking the angle-variant device at an angle of incidence at Which the angle-variant device is highly transmitting; and shining a second array of light beams at the angle-variant device, each light beam of the second array striking the angle-variant device at an angle of incidence at which the angle-variant device is highly reflecting, such that the second array of light beams is reflected onto the target surface.

9. The invention of claim 8 further comprising the step of directing a third array of light beams onto the angle-variant device at predetermined angles selected from among the first set of incident angles, such that the third array of light beams is transmitted through the angle-variant device and onto the target surface.

10. The invention of claim 8 further comprising the step of directing a third array of light beams onto the angle-variant device at predetermined angles selected from among the second set of incident angles, such that the third array of light beams is reflected from the angle-variant device and onto the target surface.

11. The invention of claim 8 wherein the angle-variant device is a Fabry-Perot resonator.

12. The invention of claim 8 wherein the angle-variant device is a diffractive optical device.

13. The invention of claim 8 wherein at least one of the first and second arrays of light beams is a multi-dimensional array.

14. The invention of claim 8 further comprising the step of focusing onto the target surface beams of light that are transmitted through or reflected from the angle-variant device.

15. A method for directing a plurality of arrays of light beams onto a target surface, each army comprising at least two light beams, the method comprising the steps of:

passing a first array of light beams through an angle-variant device and onto the target surface, the first array of light beams striking the angle-variant device at a first set of incident angles at which substantially all of the light from the light beams is transmitted through the angle-variant device; and reflecting a second array of light beams from the angle-variant device onto the target surface, the second array of light beams striking the angle-variant device at a second set of angles at which substantially all of the light from the second array of light beams is reflected from the angle-variant device.

* * * * *